United States Patent [19]

Stunkard

[11] Patent Number: 4,566,482
[45] Date of Patent: Jan. 28, 1986

[54] TOP ENTRY TRUNNION BALL VALVE

[76] Inventor: Gerald A. Stunkard, P.O. Box 748, Gladewater, Tex. 75647

[21] Appl. No.: 749,436

[22] Filed: Jun. 27, 1985

[51] Int. Cl.⁴ .............................................. F16K 43/00
[52] U.S. Cl. ...................................... 137/315; 137/72;
137/240; 137/312; 251/174; 251/315; 251/316
[58] Field of Search .................. 137/240, 241, 72, 312,
137/315; 251/174, 315, 316

[56] References Cited

U.S. PATENT DOCUMENTS

| | | | |
|---|---|---|---|
| 3,151,837 | 10/1964 | Bentley-Leek | 251/174 |
| 3,771,545 | 11/1973 | Allen | 137/315 |
| 4,151,855 | 5/1979 | Levin et al. | 251/174 |
| 4,175,577 | 11/1979 | Kacal et al. | 137/315 |
| 4,262,691 | 4/1981 | Kacal | 137/315 |
| 4,286,614 | 9/1981 | Kacal et al. | 137/72 |
| 4,388,945 | 6/1983 | Johnson et al. | 137/315 |
| 4,390,039 | 6/1983 | Johnson et al. | 137/315 |
| 4,505,294 | 3/1985 | Walter | 137/240 |

FOREIGN PATENT DOCUMENTS 1425617 2/1976 United Kingdom ................ 251/309

Primary Examiner—G. L. Walton
Attorney, Agent, or Firm—Gunn, Lee & Jackson

[57] ABSTRACT

A Top Entry Trunnion Ball Valve is provided having a valve body forming seat recesses with seat members movable disposed therein and urged towards sealing engagement with a spherical valve member by spring members and by differential pressure induced force. A seat retractor mechanism is movably disposed within the valve body and is movable by an externally controlled tool into retracting engagement with the seat members. The seat members and the seat retractor element have cooperative cam surfaces that cause camming movement of the seat members away from the valve member upon linear movement of the seat retractor. A fire safe seal and spring chamber is in communication with a relief passage having volumetric closure plugs permitting introduction of solvent or other softening agent into the spring chambers for removal of any accumulation of foreign material therein.

37 Claims, 6 Drawing Figures

TOP ENTRY TRUNNION BALL VALVE

FIELD OF THE INVENTION

This invention relates generally to top entry rotary spherical plug valves, typically known as ball valves and more specifically is directed to top entry trunnion ball valves having spring and pressure induced movable seat assemblies and means for easily and efficiently retracting such seat assemblies to permit extraction and insertion of the spherical valve element relative to the valve chamber of the valve.

BACKGROUND OF THE INVENTION

A spherical plug valve, also known as a ball valve, includes a body structure within which is movably located a plug member or ball having a through passage and defining a spherical sealing surface. The ball may have integral trunnions or may have trunnions and actuator stems operatively connected thereto in any suitable manner. Ball valves are provided with seat assemblies which are typically movable within the valve body and which establish sealing engagement with the spherical sealing surface of the ball. The sealing surfaces of the seat members are of circular form and are typically of tapered or arcuate cross-sectional configuration closely or precisely corresponding to the curvature of the spherical sealing surface of the ball. In essence, the sealing surfaces of the seat members capture the spherical sealing surface of the ball, consequentially the ball may be difficult to remove from the valve body in the event servicing becomes necessary.

In most cases ball valves are designed with two or three piece body structures, enabling body sections to be separated for ease of removing the valve element. However, two or three piece body structures are not entirely satisfactory because body leakage can occur at body seals and the valve body structure may not be capable of withstanding significant line stresses which are prevalent in piping systems controlled by such valves. Also, two or three piece body style valves require removal from the piping system for maintenance, thus increasing cost of time for maintenance and longer system shutdown time.

Top entry trunnion type ball valves have been in use for a considerable period of time and are considered to minimize many of the undesirable features of ball valves having sectioned body structures. The advantages of top entry ball valves include a one piece body structure to withstand line stresses with no body joints for possibility of leakage. The seat rings of ball valves establish sealing contact with the spherical surface of the ball. This requires that the end faces of the seat rings extend over the spherical surface of the ball in both closed and open positions of the ball. The ball is therefore contained within the inner circumferential sealing point of the seat rings. It is difficult therefore to achieve retraction of the seat assemblies sufficiently to permit installation or extraction of the ball. This disadvantage has significantly retarded wide use of top entry trunnion ball valves in the past. Top entry style trunnion ball valves do not require removal from the piping system for maintenance, thus minimizing cost of time for maintenance and system shutdown time.

Top entry trunnion ball valves are normally designed with trunnions or journals integral with a spherical shaped ball at the upper and lower portions of the ball. The ball includes a through port opening capable of axial registry with the flow passage through the valve body. Both trunnions or journals are rotatable within trunnion or journal bearings centrally located in the lower area of the body structure and in the bonnet or cover forming a closure for the access opening of the body. Two seat rings are oppositely located in seat recesses in the body at each side of the ball, being axially aligned with ball and body flow passages. The seat rings are designed to have sealing contact with the spherical sealing surface of the ball. This requires that the end faces of the seat rings extend over the spherical surface of the ball in both open and closed positions of the ball, therefore the ball is contained within the internal circumferential sealing point of the seat rings and is thus captured by the seat rings. The seat rings are preloaded against the sealing surface of the valve ball by the force of various types of springs positioned behind the seat rings. This spring preload is required to create initial sealing contact of the seat rings against the ball for further line pressure responsive seat sealing.

Because of the spring preload requirement, means must be provided for retraction of the seat rings against the spring forces to provide sufficient clearance for assembly and disassembly of the ball without damaging the spherical sealing surface of the ball by any obstructing conditions.

Top entry trunnion ball valves presently being manufactured and marketed require expensive specially designed tools to retract the seats for assembly or disassembly of the ball, or require a minimum of four holes through the valve body wall for insertion of tools to achieve retraction of the seats. These special type tools are typically of the type that maintenance personnel will not ordinarily possess. Additional holes through the valve body wall require plugging and present potential hazardous leakage points to the atmosphere which could develop due to improper plugging or due to corrosion of the plugs or wall structure adjacent the plugs. Also, manufacturing costs are significantly increased when such valve body plugs are employed.

THE PRIOR ART

Top entry ball valves accomplishing seat retraction are evidenced by U.S. Pat. Nos. 4,388,945 and 4,390,039 which employ pins driven into body holes intersecting tapered surfaces of the seat rings.

SUMMARY OF THE INVENTION

It is therefore a principle objective of the present invention to provide a novel top entry trunnion ball valve for piping installations requiring means for controlling the flow of liquids or gasses.

It is also a feature of the present invention to provide a novel top entry trunnion ball valve incorporating energized seat assemblies and further including means for efficiently retracting the seat assemblies to positions clearing the valve element for efficient insertion and removal.

It is also a feature of the present invention to provide a novel top entry trunnion ball valve incorporating an internal seat retractor mechanism that also functions to provide bearing support for one of the trunnions of the valve element.

Among the several features of this invention is contemplated the provision of a novel top entry trunnion ball valve mechanism having seat assemblies which are urged into sealing engagement with the spherical valve element by spring members disposed within spring chambers and with pressure relief passages intersecting the spring chambers to relieve any pressure that may retard seat ring retraction.

It is an even further feature of this invention to provide a novel top entry trunnion ball valve mechanism wherein the pressure relief passages incorporate plug members of substantial volume which, when removed, leave ample volume within the passages to receive a quantity of solvent or softening agent for dissolving or softening any accumulation of foreign matter within the spring chambers which might retard spring retraction movement.

Briefly, the present invention is directed to a novel top entry trunnion ball valve mechanism which may be efficiently assembled and disassembled through the use of simple and conventional wrenches and tools such as adjustable opening wrenches, box end wrenches, open end or socket wrenches, screw drivers or any other similar tool suitable for light prying. This ball valve is designed to eliminate the requirement for any special tools or wrenches and to eliminate any excessive holes or other passages through the valve body wall which must be plugged.

The valve body is of one piece construction and offers maximum resistance to stresses created from piping conditions such as bending, expansion, and contraction. Also the efficient design of the valve body structure promotes simple and economical manufacturing and assembly. Piping end connections on the valve body may be of various configurations such as, flanged, threaded, butt weld, etc. The valve body forms a top entry access opening at its upper extremity of sufficient dimension to permit passage of seat rings and the trunnion ball during assembly or disassembly operations. The top entry opening includes provision for body internal pressure sealing with respect to the bonnet or cover by a variety of sealing element options such as elastomeric O-ring, asbestos gasket, metal gasket, etc. In addition, secondary metal-to-metal sealing developing a fire safe feature of the valve mechanism is created by a precision machined surface at the upper portion of the body that corresponds with a similar precision machined surface on the lower portion of the bonnet flange. Bolts or cap screws extend through the bonnet flange in conventional manner to thus provide for mechanically retained assembly of the bonnet to the valve body.

The flow ports or passages of the body structure are each defined in part by cylindrical recesses which receive the seat rings with a slidable fit. Each seat recess is defined by cylindrical surfaces of two internal diameters of different size; the smaller diameter being at the rear of the seat recess and receiving the smaller end of the generally cylindrical seat ring in sealed relationship established by a circular O-ring or other type of sealing element. The larger diameter of the seat recess receives the larger end of the seat ring and cooperates with the seat ring to define an annular chamber receiving a spring set including plural springs and also receiving a high temperature seal member capable of providing a fire safe function. By the reduction of diameters in the seat recess, a support shoulder is developed at the rear of the larger diameter of the seat recess providing a support for the spring set. The force of the spring set urges the seat ring toward the ball and also urges the high temperature seal to its sealed relation with the seat ring and body. Passages are formed in the body structure with provisions for plugging and extend downwardly from the top of the body into intersecting relation with the larger diameter surface of the seat recess. These pressure relief passages are provided for venting any pressure from spring chambers created by compression during retraction of the seat rings. Also, the pressure relief passages provide access to the annular spring chambers for injecting any suitable softening or dissolving agent therein in the event any media should leak into the seat recesses and become solidified sufficiently to create an obstruction preventing the seat rings from retracting. Alternatively, these holes or passages may be located within the bonnet or cover seal area and may be angularly oriented within the valve body such that they intersect the seat ring recesses and spring chambers at an angle, thus containing within the valve chamber, any potential leakage that may occur through the plugs. The plugs for these holes or passages may have integral cylindrically shaped extensions to displace a majority of the volume in the passages. In the event media does leak into the seat recesses and becomes solidified, after the plugs are removed, a void or cavity will remain in the passages for receiving a significant quantity of softening or dissolving agent.

A plug member received in the bottom portion of the body structure provides access to a through threaded hole of the same size as the threaded holes in the top of the body structure. This plug may be removed from the body when desired for testing the integrity of seat sealing of the "double block and bleed" feature. In the event a seat seal is inferior, leakage through the hole developed by removal of the block and bleed plug will occur, evidencing needed repair.

The bonnet or cover is mounted on top of body with four or more standard hex head (or other style) bolts (cap screws) by protruding through clearance holes in bonnet or cover flange and threaded into mating holes in body. A through bore to receive the stem and top ball trunnion or journal, is centrally located in bonnet or cover. This bore has a larger diameter at lower area for a press fit of a sleeve type bearing. An internal shoulder is created by the reduction of bore size in the upper area that supports the stem thrust bearing and further provides metal-to-metal sealing for fire-safe conditions or prevention of stem blow-out. A through hole is provided in the cylindrical wall containing the sleeve bearing for removing the sleeve bearing by a punch type tool when renewal is required.

The seat ring sub-assembly of this invention consists of a tubular shaped ring having one or more pieces with a circular seal surface facing the ball. The seal recess receives a short length, tubular shaped, sealing element of resilient material such as Nylon, Delrin, Teflon, or other desirable materials, for positive bubble-tight sealing against ball. As an option, the seal recess may be eliminated and either a plain angular surface or a spherical concave surface mating to the spherical shape of the ball may be utilized for metal-to-metal sealing at high temperatures, such as for steam service. A tapered shoulder on the outer periphery of seat ring supports a wedge cross section shaped circular high temperature seal ring manufactured from graphite impregnated material. One type of this high temperature sealing material is sold under the registered trademark GRAFOIL and withstands temperatures in excess of 4000° F. The high temperature seal ring is utilized for fire-safe sealing which is explained below. Behind the high temperature seal ring is a metal spacer or shim being of a split style, followed by a spring set consisting of a quantity of spring segments as required to achieve the desired spring preload to force the seat ring against the ball for initial sealing. The spring segments are also of the split or spiral style. Spacer or shim and spring segments are contained in a wide circular groove on outside periphery of seat ring. Spacer or shim and spring segments inside diameters are approximately 0.010 inches larger than groove diameter for free movement. The rear section of the seat ring has an outside diameter slightly larger than the inside diameters of spacer or shim and spring segments to create a shoulder to prevent the spring segments, spacer or shim and high temperature seal ring from slipping off of the seat ring during installation of the seat ring sub-assembly into its seat recess. The purpose of the split style spacer or shim and split or spiral style spring segments is to aid assembly by spiral installation of the same on the seat rings. The rear section of the seat ring also contains a circular groove for an elastomeric seal such as an O-ring or other styles of seals. This seal is responsible for the line pressure responsive seat sealing. The line pressure responsive seat sealing design develops positive seat sealing in both directions simultaneously, more commonly referred to as "double block and bleed", that is necessary to prevent product contamination in pipe manifold applications. The rear end of the seat ring has an internal reverse circumferential taper with a relative sharp edge on the outside diameter. The sharp edge will scrape or cut away any debris that has settled in the void space in the body bore as the seat rings are retracted within the bore. The internal reverse taper also reduces flow turbulence that develops when product flows over any cavity at high velocity. The front end of the seat ring has a large angular or chamfered circumferential surface on the outside diameter of end face. This chamfered surface is required for cam action to retract the seat ring away from ball as discussed below. A narrow circumferential groove is provided on the large outside diameter of seat ring that permits the engagement of a screwdriver, or any other suitable tool, for prying seat rings outward from the seat recesses, if required.

The trunnion ball has a spherical shape of true sphericity within 0.001 to 0.002 inches to assure accurate positioning and positive sealing with the seats. A through cylindrical port is centrally located in relation to the spherical shape of the ball. Integral with the spherical shape are two opposing, short, large diameter trunnions or journals positioned at 90° to axis of the through port hole. The bottom trunnion or journal has a blind hole on the axis of trunnion or journal to receive a static electricity grounding spring. The end face of the top trunnion or journal has a rectangular shaped recess or slot with a depth sufficient for engagement of a tongue or key on bottom end of stem. The axis of the recess or slot is positioned at 90° to the axis of the through port hole in the ball. During stem and ball rotation, this permits certain mis-alignment of the axes of the trunnions or journals in relation to the axis of the stem that may be created by manufacturing tolerances, sleeve bearing wear and assembly of the bonnet or cover to body. Also, any pressure induced downstream movement of ball when in closed position will not develop any side thrust forces on stem. In the bottom of the recess or slot is a blind threaded hole of the same size as the threaded holes in the top of body, the purpose of which is explained later.

The stem is of cylindrical shape with a large diameter at the lower end that creates a shoulder to develop a blow-out proof safety feature. The lower end also has a tongue or key configuration for engagement with the recess or slot in the top trunnion or journal of the ball with a preferable 0.001 to 0.003 inch clearance for free movement. The stem shoulder receives a flat thrust bearing made from a low friction material such as Nylon, Delrin, Teflon, etc. A metallic or graphite material may be used for high temperature service. The upper stem section has circumferential grooves to receive elastomeric seals such as O-rings or other style of seals. Also, provisions for high temperature stem packing may be incorporated for high temperature service. The upper end of the stem projects above the bonnet or cover and has provisions for adaption of a lever or gear operator for manual operation, or an actuator for power operation, as required to rotate the ball to its open and closed positions. Adaption may be of a variety of methods such as, keyed, pinned, square or hex drive, etc. Since the stem is separate from the ball trunnion or journal, it becomes radially pressure balanced, thus side loading against stem in bonnet or cover is eliminated.

Centrally positioned in bottom of the body is a removable trunnion or journal bearing retainer having a sleeve type bearing pressed into the same. A round pin is pressed in a hole in center of bottom section. The pin is required for centrally retaining a coil type static electricity grounding spring. A through hole is provided in the cylindrical wall of the retainer for removing the sleeve bearing by a means of a punch type tool when renewal of the sleeve bearing is required. One or more circular grooves are located on the top face of the bearing retainer to aid in positioning of seat rings in preparation for assembly of the ball (explained later). The top face of the bearing retainer has an angular or chamfered circumferential surface on the outside diameter. This surface is required for cam action in retracting the seat rings away from ball as explained later. The bearing retainer outside diameter is required to be larger than face to face dimension of ball to permit installation and removal of the ball.

FIRE-SAFE FEATURE

In the event of excessive heat or fire destroying the seat ring inserts, stem thrust bearing and all elastomeric seals, while the piping system is pressurized and the ball is in either open or closed position, the seat rings are actuated against the ball by the spring forces behind the high temperature seal rings, developing circumferential metal sealing contact with the ball by a precision machined surface on inside of seat ring face. The material of the high temperature seal is sufficiently pliable to expand diametrically, from the spring forces acting in concert with the tapered surface on the outside diameter of the seat ring and also from thermal expansion characteristics of the high temperature seal material. This diametrical expansion develops interference contact of the outside diameter and the inside tapered diameter of the high temperature seal ring with the inside diameter of the seat ring recess and outside tapered diameter of the seat ring respectively, thus creating a sealing effect to prevent leakage around the outside diameter of the seat rings. Responsive line pressure increases sealing capabilities. The bonnet or cover is in precision machined metal contact with body. Pressure within the body cavity will force the stem upward creating sufficient metal-to-metal sealing as the precision machined stem shoulder contacts the recess face in the bonnet or cover.

Other and further features and advantages of the present invention will become apparent to one skilled in the art upon consideration of this disclosure. The form of the invention, which will now be described in detail, illustrates the general principles of the invention, but it is to be understood that this detailed description is not to be taken as limiting the scope of the present invention.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings, which drawings form a part of this specification.

It is to be noted however, that the appended drawings illustrate only typical embodiments of the invention and are therefore not to be considered limiting of its scope, for the invention may admit to other equally effective embodiments.

IN THE DRAWINGS

Figure 1:
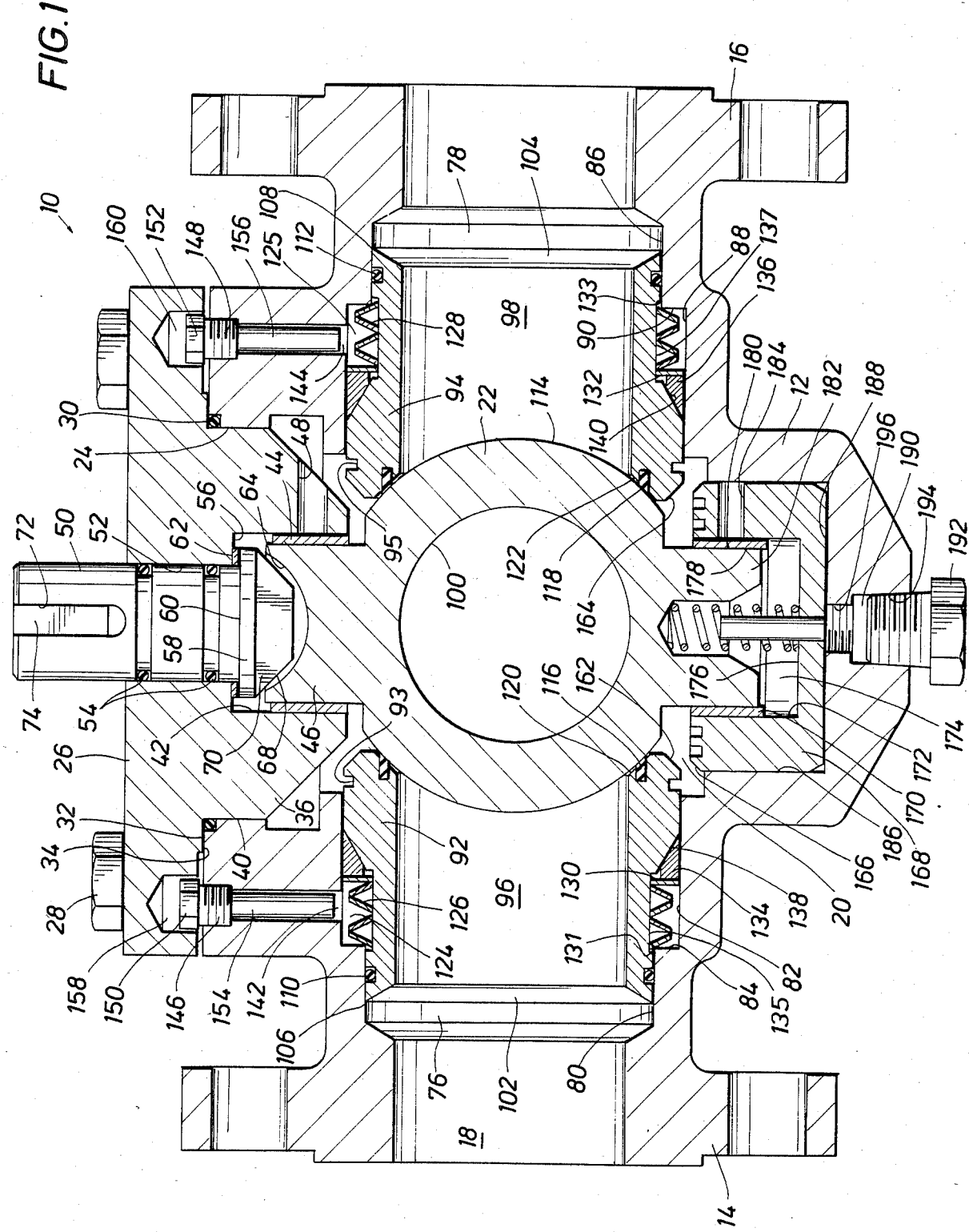

FIG. 1 is a sectional view of a top entry trunnion ball valve constructed in accordance with the present invention with the spherical valve member or ball thereof shown in the closed position and with the seat assemblies thereof in normal sealing engagement with the spherical surface of the ball.

Figure 2:
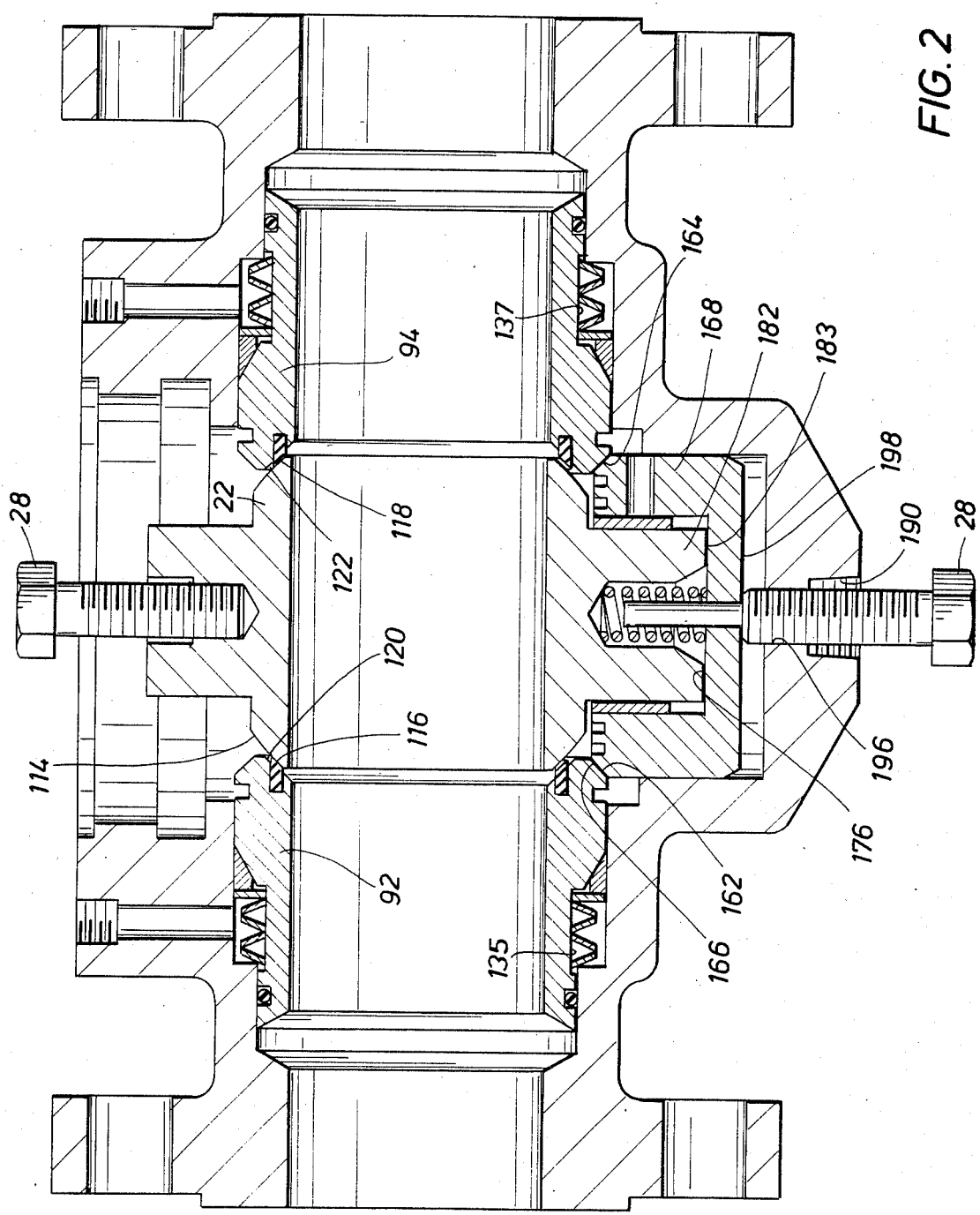

FIG. 2 is a sectional view of the valve of FIG. 1 with the bonnet structure and spring chamber pressure relief plugs removed and illustrating simultaneous camming of the upper and lower portions of the seat assemblies to minimize cocking of the seat assemblies during retraction.

Figure 3:
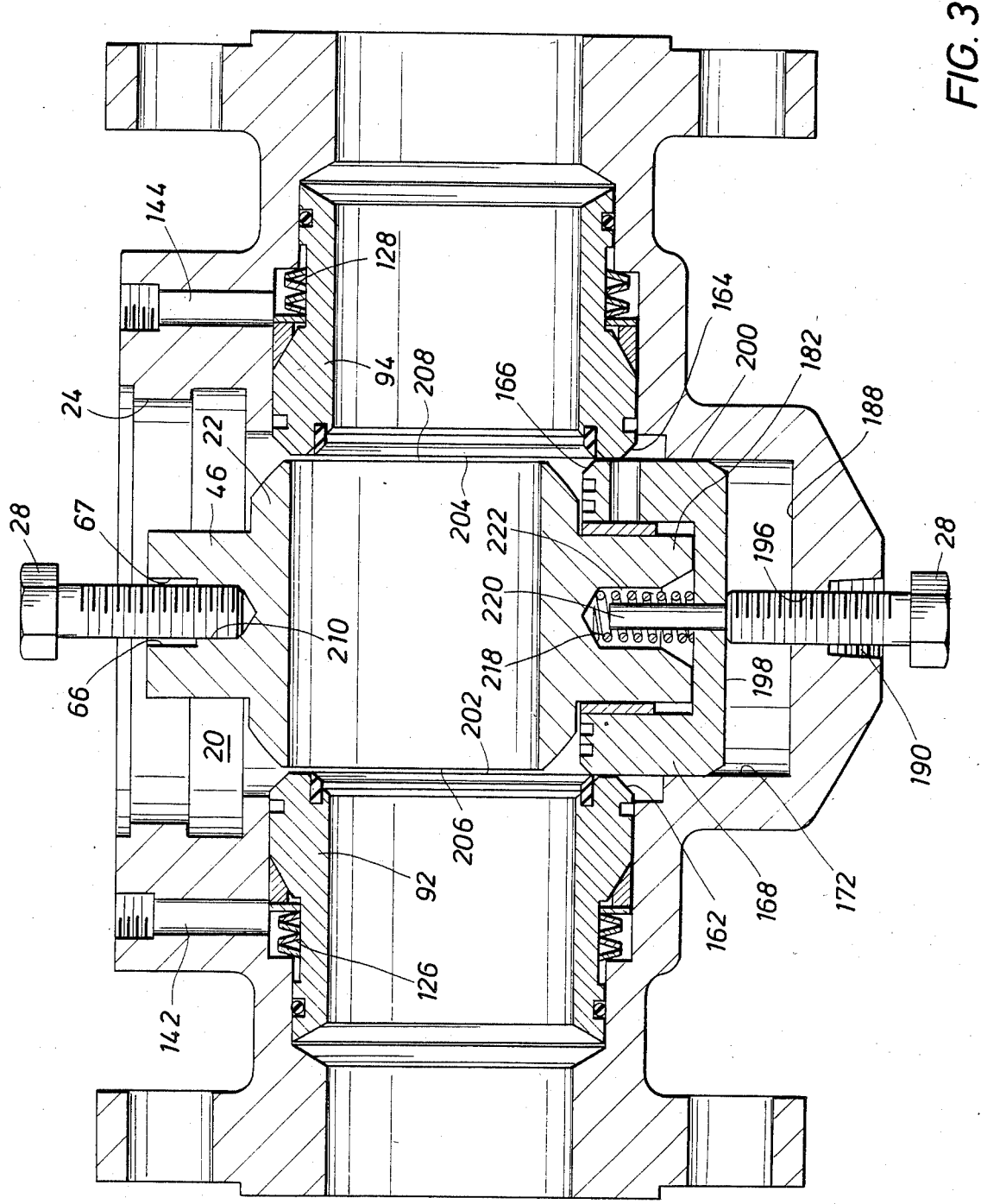

FIG. 3 is a sectional view of the valve mechanism of FIG. 1 with the bonnet structure and spring chamber pressure relief plugs removed and with the seat assemblies retracted to the maximum extent thereof by upward movement of a seat retractor element.

Figure 4:
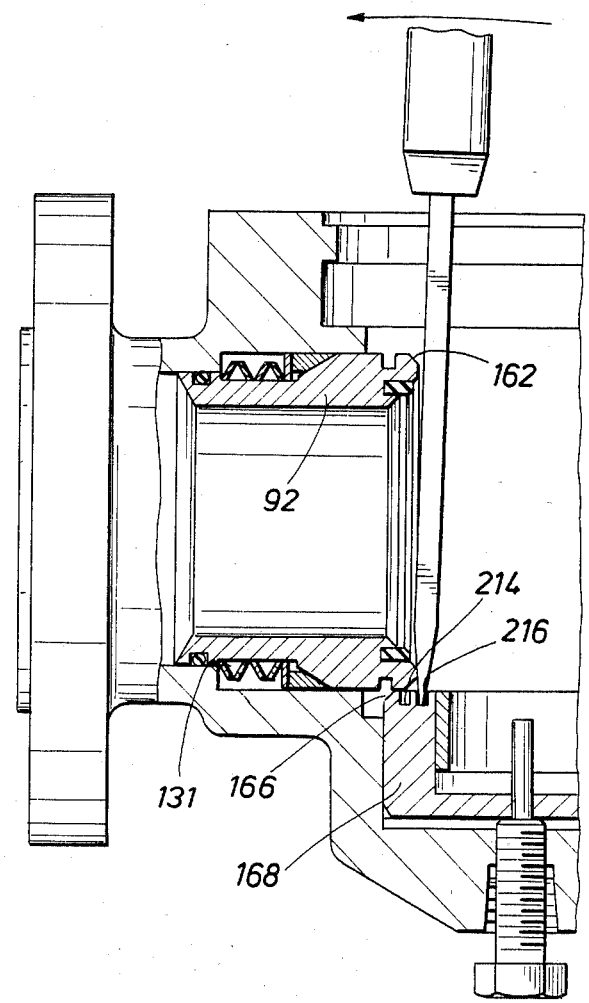

FIG. 4 is a partial sectional view of the valve mechanism of FIG. 1 illustrating the use of a screw driver or other pry tool to force the seat assemblies sufficiently deep into their respective seat recesses that the seat retractor will establish retracting engagement with the seat assemblies for preparation of ball installation.

Figure 5:
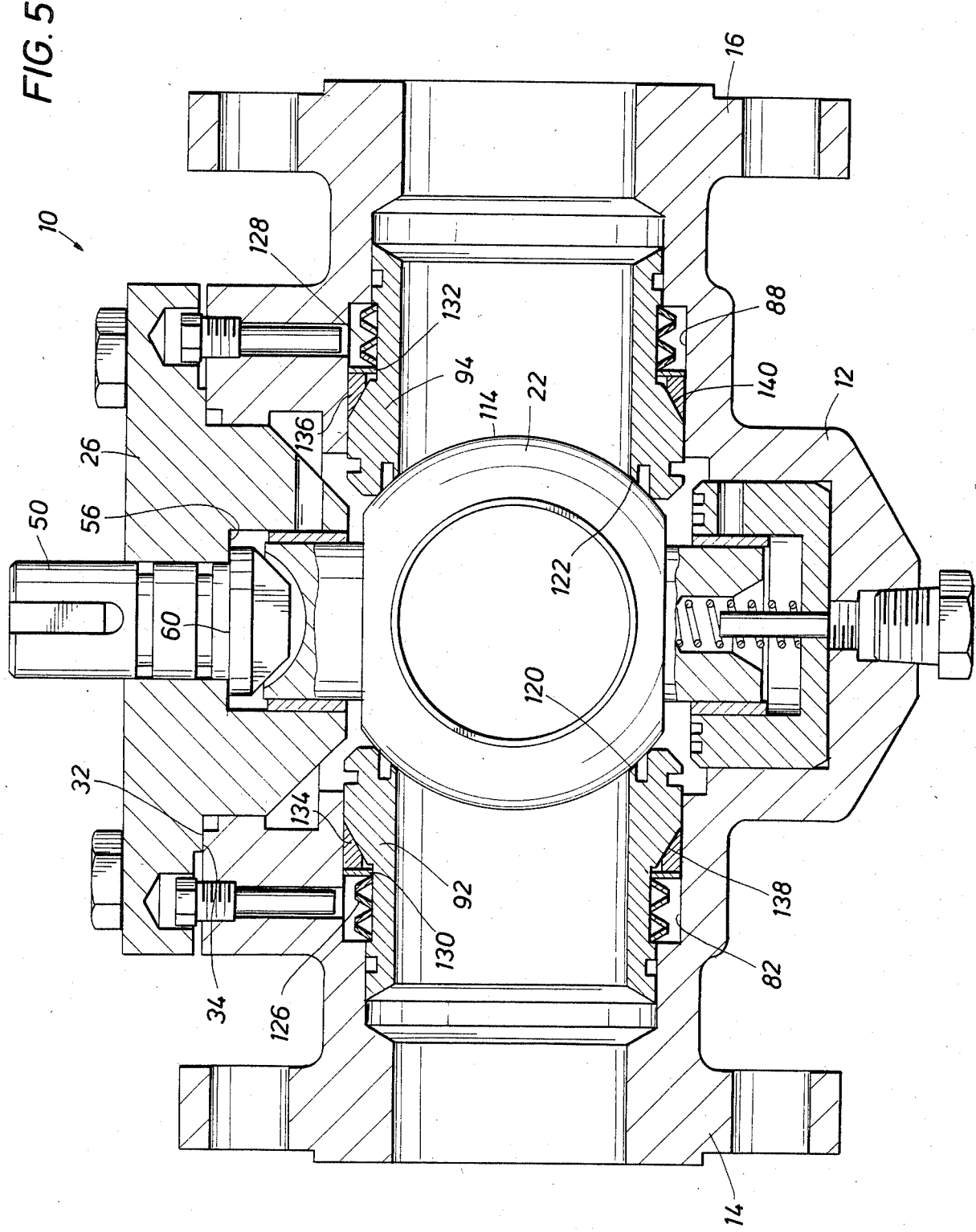

FIG. 5 is a fragmentary sectional view of the top entry trunnion ball valve mechanism of FIG. 1 illustrating the condition of the valve mechanism after being exposed to excessive heat or fire.

Figure 6:
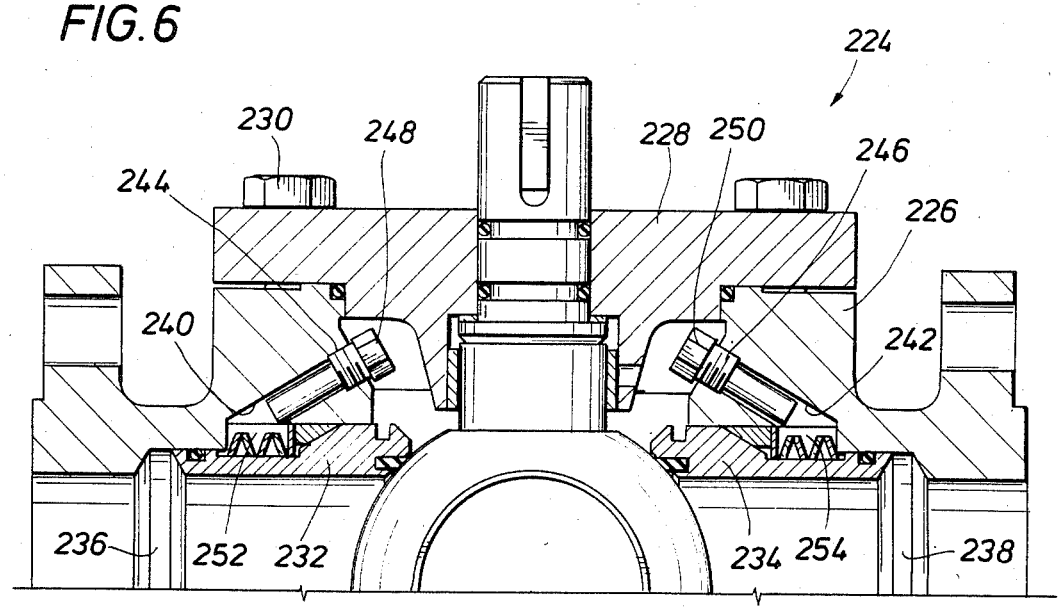

FIG. 6 is a partial sectional view of a top entry trunnion ball valve mechanism representing an alternative embodiment of the present invention.

DETAILED DESCRIPTION OF THE PREFERRED EMBODIMENT

Referring now to the drawings and first to FIG. 1, a spherical plug valve, also referred to as a ball valve, is illustrated generally at 10 and includes a one piece body structure 12 forming connection flanges 14 and 16 for bolted connection of the body structure into a flow line to be controlled by the valve. Although connection flanges are shown, it is not intended to limit this invention to the use of connection flanges, it being within the scope of this invention to provide other means of connection such as threaded connection, weld connection etc. to secure the valve into the flow line. The body structure further defines a flow passage 18 intersecting a valve chamber 20 within which is disposed a rotatable spherical plug or ball member 22. For the purpose of ingress and egress of the ball member 22, such as during assembly or repair operations, the body structure also defines an access opening 24 of sufficient dimension that the various internal parts of the valve mechanism will readily pass through the access opening during assembly and disassembly procedures. The access opening 24 is closed by means of a bonnet or closure member 26 which is secured to the body structure by means of a plurality of bolts or studs 28. The bonnet 26 is sealed with respect to the valve body 12 by means of an elastomeric O-ring or other type of sealing element 30 which is retained within a circular seal pocket cooperatively defined by the valve body and bonnet. In the event the elastomer sealing element 30 might be destroyed by excessive heat, such as when the valve is subjected to a fire, the bonnet also establishes metal-to-metal sealing with the body by virtue of precision machined surfaces 32 and 34 of the body and bonnet respectively. The bonnet further defines a depending projection 36 which extends into the access opening 24 of the body structure. A cylindrical surface portion 40 of the depending bonnet projection 36 establishes a rather close fit with the body access opening surface 24. Regardless of the pressure condition within the valve body, the elastomeric sealing ring 30 is efficiently retained against displacement from its seal groove by the metal-to-metal sealing surfaces 32 and 34 and the close fitting cylindrical surfaces 24 and 40.

It is appropriate to support the ball member 22 such that lateral displacement of the ball is minimized. Accordingly, the bonnet 26 is formed to define a bearing receptacle 42 of cylindrical form which receives a cylindrical bearing 44 in press fitted relation therein, receiving the upper trunnion member 46 of the ball 22 in bearing engagement. A through passage 48 is formed in the bonnet projection 36 in transverse intersecting relation with the bearing receptacle 42. To remove the bearing member from its press fitted relationship within the receptacle 42, a suitable tool may be inserted through the passage 48 and the thin bearing may be crimped inwardly, causing consequent reduction of its outer dimension. By loosening the bearing in this manner, it may be easily withdrawn from the bearing receptacle.

For achieving rotation of the ball member 22 to its open and closed position within the valve body, a rotatable valve stem member 50 extends through a valve stem bore 52 in the bonnet and is sealed with respect to the bonnet by means of O-ring or other type sealing members 54. The valve stem bore or passage 52 is centrally located with respect to the bearing receptacle and is of smaller dimension than that of the bearing receptacle, thus defining a circular thrust shoulder 56. The valve stem defines an enlarged drive head 58 forming a shoulder 60 which maintains a stem bearing member 62 in thrust transmitting relation with the shoulder 56. The stem bearing may be formed of low friction polymer material. In the event a fire safe valve is desired the stem bearing may be composed of a metal or graphite material. The drive head portion 58 of the valve stem effectively prevents the valve steam from being blown out of the valve stem passage, such as by excessive body pressure. The upper trunnion member 46 of the valve ball 22 defines a drive slot 64 which is shown in FIG. 1 as being of arcuate configuration and has parallel drive surfaces 66 and 67 which are evident in FIG. 3. The bottom wall of the drive slot may also be of other suitable configuration such as square, rectangular etc. without departing from the spirit and scope hereof. The drive head of the valve stem forms a drive blade 68 forming parallel drive surfaces 70 which establish a close slide fitting driving relation with the parallel surfaces 66 and 67 of the drive slot. The arcuate configuration of the bottom wall of the drive slot, as shown at 64, is so oriented that the upper end portion of the trunnion member 46 is of completely circular configuration, thereby enhancing the structural integrity of the driving connection between the drive blade 68 and the drive slot. The valve stem is also formed with a keyway 72 receiving a square or rectangular key 74 to establish a driving connection between the valve stem and any suitable manual or powered valve operator mechanism.

The integral body structure 12 forms opposed seat recesses 76 and 78 which are each defined by cylindrical surfaces of different dimension. As shown, seat recess 76 is formed by small diameter cylindrical surface 80 and by large diameter cylindrical surface 82 forming a radial abutment surface 84 at the juncture thereof. Likewise, seat recess 78 is formed by a small diameter cylindrical surface 86 and a larger diameter cylindrical surface 88 with radial abutment surface 90 at the juncture thereof. Within the seat recesses are disposed movable seat members 92 and 94 each forming through passages 96 and 98 in registry with the flow passage 18. The through passages 96 and 98 are positioned for registry with a through passage 100 formed in the valve ball 22. Tapered end surfaces 102 and 104 of the respective seat members define scraping edges 106 and 108 which are rather sharp and are capable of scraping away any accumulation of debris such as sediment, line scale etc. from the cylindrical surfaces 80 and 86 during seat retraction movement. These tapered end surfaces also minimize turbulence in the flow of liquids and gasses. The seat members are sealed with respect to the cylindrical surfaces 80 and 86 by means of O-ring or other type elastomeric sealing members 110 and 112. The scraping edges cut away any sediment or other foreign matter which might otherwise prevent retraction of the seat rings. Under circumstances where excessive body pressure should develop, such as from thermal conditions, a pressure differential will be developed which induces a resultant force on the seat rings in opposition to the spring induced forces. This resultant force will cause the seat ring with least differential pressure to move slightly against its spring force, thus relieving excessive body pressure into the line. Body cavity pressure will therefore equalize to a pressure differential slightly above the corresponding line pressure, this pressure differential being controlled by the spring force.

It is desirable that the seat members be urged into sealing engagement with the spherical sealing surface 114 of the ball member 22 to maintain sealing interference between circular seal members 116 and 118 and the spherical sealing surface 114 of the ball member. Also, in the event of excessive heat which might destroy the sealing members 116 and 118, which for example may be composed of a suitable sealing material such as polytetrafluoroethylene, it is desirable that the seat members have the capability of being moved into metal-to-metal sealing contact with the spherical surface 114 of the ball to thus provide the valve mechanism with fire-safe sealing capability. This feature is evident from FIG. 5 which illustrates the condition of the valve in the event of prolonged excessive heat. The seat members define tapered end surfaces 120 and 122 as shown, which also may be of spherical concave surface configuration if desired, for the establishment of a metal-to-metal seal with the ball member in the manner shown in FIG. 5.

The seat members 92 and 94 cooperate with the large diameter cylindrical surfaces 82 and 88 of the respective seat recesses to define annular spring and high temperature seal chambers 124 and 125. Within these annular chambers are located a plurality of spring members 126 and 128, which may be in a form of split belleville springs as shown or in the alternative, may take any other suitable form. The spring assemblies bear against respective radial abutment shoulders 84 and 90 and also engage spacers or shims 130 and 132. The springs are retained about reduced diameter cylindrical portions 135 and 137 of the seat rings with the outermost ring in contact with annular shoulders 131 and 133 respectively in the manner shown in FIG. 4, causing the spring set, shim and high temperature seal to be retained in assembly with the seat ring. When the seat, spring, shim and seal assembly is handled during seat installation, the springs, engaging the respective shoulders 131 and 133 will retain all of the parts in assembly. Thus each seat assembly is installed into its seat recess as a unitary assembly. At the innermost portions of the annular chambers nearest the ball member 22, high temperature seal ring members 134 and 136 are urged by the spring members and shims in a direction toward the ball member. These high temperature seal rings engage tapered surfaces 138 and 140 formed on the respective seat members and are of wedge shaped configuration corresponding with the configuration of the annular chambers. Thus, the high temperature seal rings establish sealing engagement between the seat members and the respective large diameter cylindrical surfaces of the seat recesses in the valve body and maintain such sealing even under extremely high temperature conditions, such as would be encountered in the event the valve is subjected to fire. The high temperature seal ring members may be composed of any suitable high temperature sealing material but, for purposes of ready understanding, the high temperature seal rings may conveniently take the molded form from graphite tape such as manufactured and sold by Union Carbide Company under the registered trademark GRAFOIL ®. Grafoil high temperature seal rings will withstand temperatures in excess of 4000° F. and yet maintain an effective seal. In the event therefore that the face sealing members 116 and 118 and the elastomeric sealing members 110 and 112 should become destroyed by excessive temperature, an effective seal will be maintained between the seat members and valve body by means of the high temperature seal rings in the manner shown in FIG. 5. Further, a metal-to-metal seal will be established between the spherical sealing surface 114 of the ball member and the sealing faces 120 and 122 of the seat rings. Sealing of the bonnet will also be maintained in case of excessive heat destroying bonnet seal 30, by the metal-to-metal sealing surfaces 32 and 34. Also, in case of excessive heat destroying stem seals 54, surfaces 56 and 60 at the stem and bonnet assembly will establish metal-to-metal sealing in the manner shown in FIG. 5. In this manner, even under high temperature conditions, valve leakage will be prevented or effectively minimized, thereby preventing the line fluid controlled by the valve from feeding a fire in the immediate vicinity of the valve.

In order to accomplish installation and removal of the ball member 22, the seat members 92 and 94 must be retracted against the compression forces of the springs 126 and 128 sufficiently to allow passage of the ball member therebetween as shown in FIG. 3. It is necessary that the seat members be capable of such retraction. In the event the annular spring chambers 124 and 125 should become fouled with sediment or other contaminant from the media such that retraction of the seat assemblies can not be accomplished, the valve mechanism provides an efficient procedure and apparatus for dissolving or otherwise cleaning accumulated contaminant from the annular spring chambers. The body structure 12 is machined to define bores 142 and 144 having external portions thereof internally threaded for receiving the threaded portions 146 and 148 of plug members 150 and 152. The plug members define elongated displacement extensions 154 and 156 which prevent the bores 142 and 144 from becoming completely filled with contaminant that might leak into the spring chambers. When the plugs are extracted from the bores, the space occupied by the extensions define receptacles for receiving any suitable cleaning or dissolving fluid that is capable of softening or dissolving contaminant material from the annular chambers 124 and 125. With the valve positioned as shown in FIG. 2, a quantity of solvent or other cleaning fluid may simply be injected into the bores 142 and 144. The solvent will enter the chambers 124 and 125, thereby softening or dissolving deposits of contaminant. After this has been done, the seat members may be efficiently retracted in the manner described hereinbelow.

The plug members 150 and 152 also provide a positioning function for the bonnet member 26. Recesses 158 and 160 are formed in the flange portion of the bonnet 26 and, with proper positioning of the bonnet relative to the valve body 12, the heat portions 150 and 152 of the plugs will be received within the appropriate positioning receptacles.

As mentioned above, it is desirable to provide a mechanism for efficiently retracting the seat members 92 and 94 in order to permit the ball member 22 to be efficiently installed and extracted during assembly and disassembly procedures. The seat members 92 and 94 are formed to define tapered circumferential cam surfaces 162 and 164 which are located for contact with a tapered circumferential cam surface 166 of a bearing retainer element 168. The bearing retainer functions normally to retain a cylindrical bearing 170 which is in press fitted assembly with an internal cylindrical surface 172 of a bearing receptacle 174 which is cooperatively defined by the cylindrical surface 172 and a bottom surface 176. The bearing 170 may be composed of any suitable bearing material and forms an internal cylindrical surface 178 receiving the external cylindrical surface 180 of the lower trunnion member 182 of the ball 22. The trunnion 182 also defines a planar end surface 183. The bearing retainer 168 also defines a through passage 184 enabling a tool to be inserted therethrough for the purpose of deforming the press fitted bearing 170, thus reducing its outer diameter and enabling it to be easily extracted when bearing replacement is appropriate. The bearing retainer 168 is positioned within a receptacle of the lower portion of the body 12 which is defined cooperatively by a cylindrical surface 186 and a planar bottom wall surface 188. The bearing retainer establishes a close fit within its receptacle to ensure that the ball member is not permitted to shift laterally within the valve chamber, especially during conditions of high differential pressure when the valve is closed. Nevertheless, the retainer element 168 is linearly movable within its receptacle under the influence of a predetermined axial force.

The body 12 forms a lower passage 190 which is normally closed at its outer extremity by a threaded plug member 192 received by an outer threaded portion 194 of the passage. The plug 192 forms a block and bleed plug which is removed to permit inspection of seat sealing integrity. With the valve ball in its fully open or closed positions and the body vented by removal of the plug 192, leakage of line media from the passage 190 will indicate leakage of either or both of seat members 92 and 94. The passage 190 also defines an inner threaded segment 196 forming internal threads which are of mating dimension with that of the bonnet bolts 28. With the ball in its open position as shown in FIG. 2, one of the bonnet bolts 28 is threaded into the inner threaded section 196 of the passage 190 bringing the bolt into contact with the bottom surface 198 of the bearing retainer 168. As the bolt is then rotated, it applies a force on the bearing retainer 168, moving it linearly in an upward direction.

It is desirable to have design and manufacturing tolerances as such to develop a clearance dimension between the inside bottom surface 176 of the bearing retainer 168 and the bottom face 183 of the lower ball trunnion member 182 to be equal within approximately 0.010 inches of the clearance dimension between the circular cam surface 166 of bearing retainer 168 and circular cam surfaces 162 and 164 of respective seat ring members 92 and 94. As shown in FIG. 2, initial linear movement of bearing retainer induced by force from the bolt, causes circular cam surface 166 of bearing retainer 168 to engage with circular cam surfaces 162 and 164 of respective seat ring members 92 and 94, and engagement of inside bottom surface 176 of bearing retainer 168 and bottom face 183 of lower ball trunnion 182, simultaneously or within approximately 0.010 inches.

As the bolt is then driven inwardly, by rotating it with any suitable wrench, the interacting cam surfaces in conjunction with the existing contact of spherical surface 114 of ball member 22 with circular seal members 116 and 118 or inside circular surfaces 120 and 122 of respective seat ring members 92 and 94, and with consideration given to the aforementioned approximate 0.010 inches clearance difference, the seat ring members will retract away from ball member, against the resistance of springs 126 and 128, uniformly in a parallel motion sufficient to prevent any possible mis-alignment or "cocking" of seat ring members within cylindrical surfaces 80, 82, 86 and 88. Although the above stated means for retracting the seat ring members are most desirable, it is not to be construed that this invention be limited to such simultaneous camming requirements. Actual testing has proven that retraction of the seat ring members away from the ball member can be accomplished individually by the camming action of circular cam surface 166 of bearing retainer 168 against circular cam surfaces 162 and 164 of respective seat ring members 92 and 94, or by the camming action of spherical surface 114 of ball member 22 against circular seal members 116 and 118 or inside circular surfaces 120 and 122 of respective seat ring members 92 and 94.

After the seat assemblies have been retracted to their maximum extent, further upward movement of the bearing retainer 168 will cause the external cylindrical surface 200 thereof to become interposed between the end surfaces 202 and 204 of the seat assemblies. This position is shown in FIG. 3. The bearing retainer, being of larger diameter than the face to face dimension of the ball, maintains the seat assemblies in a properly spaced relationship permitting a sufficient clearance to exist between end surfaces 202 and 204 of seat assemblies and opposed end surfaces or faces 206 and 208 of the ball member 22, thus permitting the ball member to be extracted from the position shown in FIG. 3, through the access opening defined by surface 24.

To assist in removal of the ball from the valve chamber 20, the ball member defines an internally threaded receptacle 210 located in upper trunnion 46 of ball member which is adapted to receive the threads of another bonnet bolt 28. With the valve stem 50 separated from its interengaging relation with the upper trunnion 46 of the ball, a bolt 28 may be threaded into the internally threaded receptacle 210. If the valve is of relatively small dimension, a worker may then grasp the bolt 28 and apply an upward force thus extracting the ball member from the valve chamber. If the valve ball is of large dimension, and thus quite heavy, any suitable lifting apparatus may be attached to the bolt thus permitting the ball member to be lifted by appropriate mechanical lifting apparatus.

After installation of the seat assemblies 92 and 94 into their respective seat recesses, the seat assemblies must be retracted sufficiently to permit cam surface 166 of the bearing retainer 168 to engage the cam surfaces 162 and 164 of the respective seat assemblies. The seat retainer 168 defines one or more circular grooves or slots 214 and 216. As shown in FIG. 4, by using a conventional screwdriver or other suitable prying tool engaged in circular grooves, force may be brought to bear on the respective end surfaces of the seat assemblies thereby forcing them into the seat recesses with minimal compression of the springs for positioning cam surfaces 162 and 164 for contact by the tapered cam surface 166 of the bearing retainer.

The valve mechanism of the present invention is provided with a static electricity grounding spring 218 which is received about a spring retainer pin 220 extending upwardly from the bottom wall portion of the retainer element 168. The grounding spring and retainer pin are received within an appropriate grounding spring receptacle 222 formed in the lower trunnion member 182 of the ball as shown in FIG. 3.

Referring now to FIG. 6, an alternative embodiment of the present invention is illustrated generally at 224. In this embodiment a valve body 226 is provided which is of the same general configuration as the valve body 12 of FIG. 1. The access opening of the body 226 is closed by means of a bonnet 228 which is secured to the body by means of a plurality of bolts or cap screws 230. Seat rings 232 and 234 are received respectively within seat recesses 236 and 238. The seat rings and seat recesses are of generally identical construction as described above in connection with FIG. 1.

A pair of pressure relief passages 240 and 242 are formed in the body 226, these passages being inclined and oriented to intersect the respective spring chambers 252 and 254 and to intersect the access passageway portion of the valve body. Outer portions of the respective passages 240 and 242 are internally threaded and receive the threaded portions 244 and 246 of elongated displacement plug members 248 and 250. These displacement plug members and their respective function are essentially identical to plug members 150 and 152 of FIG. 1.

In the event of leakage of either of the plug members 248 and 250, the leaking fluid will not contaminate the atmosphere or develop a hazard externally of the valve. The leaked fluid will be contained within the valve body, thereby providing a top entry trunnion ball valve mechanism which is inherently safe.

FIRE-SAFE FEATURE

Referring now to FIG. 5, in the event of excessive heat or fire destroying the seat ring inserts 116 and 118 and the stem thrust bearing 62 and all bonnet, seat ring and stem elastomeric seals, while the piping system is pressurized and the ball is in either its open or closed position, the seat members will be actuated into sealing engagement with the ball by the forces of springs 126 and 128 respectively. The spring forces bear against spacers or shims 130 and 132 respectively behind the rear surfaces of the high temperature seal rings 134 and 136, developing circumferential metal sealing contact with the ball by the precision machined angular sealing surfaces 120 and 122, defining sealing faces of the respective seat members. The material of the high temperature seals 134 and 136 is sufficiently pliable to expand diametrically from the spring set forces and the camming activity of the inside tapered diameter of the high temperature seals and the tapered surfaces 138 and 140 defined on the outside diameter of the seat members. Seal expansion also occurs due to the thermal expansion characteristics of the high temperature sealing material, causing the seals 134 and 136 to develop interference contact of the outside diameter and the inside tapered diameter thereof with the inside diameters 82 and 88 of the seat recesses and the outside tapered diameter of the seat members respectively. This seal expansion activity creates a sealing effect to prevent leakage around the outside diameter of the seat members. Responsive line pressure acting on the high temperature seal ring members increases the sealing capability thereof. The bonnet 26 is in precision sealing contact with the valve body by virtue of the mechanical sealing surfaces 32 and 34. Pressure within the body cavity will force the valve stem upwardly creating efficient metal-to-metal sealing by the precision machined metal surface 60 of the stem with shoulder surface 56 within the trunnion receptacle of the bonnet.

ASSEMBLY PROCEDURE

The following assembly procedure may be followed for proper assembly of the valve mechanism of this invention. This procedure however may be varied slightly to suit the needs of the user.

A sleeve bearing 44 is assembled to the bonnet by press fitting followed by press fitting of the opposite sleeve bearing 170 and the grounding spring centering pin 220 into the bearing retainer 168. On seat rings 92 and 94, seat inserts 116 and 118 are installed in insert recesses in the sealing faces. High temperature seal rings (also referred to as Grafoil ® high temperature seal rings) are positioned about the tapered shoulders 138 and 140 of the seat members. This is followed by spiral assembly of the split type spacer or shim members 130 and 132 and the split or spiral type spring set onto the wide grooves 135 and 137 of the seat members with the last spring segment of each spring set being retained against spring retainer shoulders 131 and 133. The elastomer sealing members 110 and 112 are then installed into external grooves in the seat members.

The bearing retainer 168, including bearing 170 and the static electricity grounding spring centering pin 220, is then installed in the lower recess of the body to the position shown in FIG. 1. The seat ring assemblies, complete with high temperature seal ring, springs, shim and seals, are then lightly lubricated and installed into the opposed seat recesses far enough to achieve resistance from the spring set compression and/or seal squeeze interference. A bonnet cap screw or bolt 28 is then threaded into the mating threaded hole 196 of the body and is rotated with a wrench in order to force the bearing retainer member 168 upwardly until it establishes engagement with the seat members. If the tapered cam surfaces 162, 164 and 166 are not in registry, a screwdriver or other prying tool is engaged in the upper grooves 214 and 216 of the bearing retainer and a prying force is applied against the end surfaces of the seat members in the manner shown in FIG. 4, forcing them sufficiently into their respective seat recesses so that the camming surfaces 162, 164 and 166 will be brought into operative contact. The bolt is then further rotated, causing the bearing retainer to be forced upwardly, resulting in retracting movement of both seat members by the interacting cam surfaces. This activity continues until the outside diameter 200 of the bearing retainer is in tangent contact with both of the seat ring faces 202 and 204 as shown in FIG. 3, thus providing sufficient clearance between the seat ring faces to permit installation of the trunnion ball within the valve body. Prior to insertion of the ball into the valve body, the static electric ground spring 218 is installed about its retainer pin 220.

A bolt or cap screw 28 of the bonnet is then inserted into the threaded opening 210 of the upper trunnion member of the ball for ease of handling. The ball, in its open position orientation relative to the body flow passages, is then inserted through the access opening of the valve body and its lower trunnion is carefully inserted into the bearing of the bearing retainer. The cap screw or bolt is then unthreaded from the bottom hole of the valve body thereby permitting the bearing retainer to be moved downwardly into its receptacle. The ball and bearing retainer is then forced downwardly until the bearing retainer becomes disengaged from contact with the end surfaces of the seat members. The seat members will then automatically become positioned, by the force of their respective spring sets, accurately in relation with the trunnion ball, thus developing an initial sealing contact between the seat assemblies and the spherical surface 114 of the trunnion ball. The cap screw is then removed from the trunnion ball. The plug members 150 and 152 are then threaded into their respective passages in the valve body, thus closing the passages to the annular spring chambers. With the stem thrust bearing and stem seals installed on the stem member 50, the tongue or key defining the lower end of the valve stem is inserted into the recess or slot formed in the upper trunnion or journal of the ball. The stem is then lubricated at the area of contact with the stem bore 52 in bonnet member. The assembly procedure is completed by positioning bonnet over stem in proper orientation with body and attaching the bonnet to the upper portion of the body by means of the bolts or cap screws 28. Afterwards, any suitable valve actuator may be brought into assembly with the valve stem 50 for manual or powered actuation as required.

DISASSEMBLY PROCEDURE

With the valve installed in a piping system the piping system is bled down to atmospheric pressure both upstream and downstream of the valve location. The block and bleed plug 192 is then removed from the lower portion of the valve body exposing the passage 190 and the internal threads 196. The bonnet 26 is then removed from the upper portion of the valve body. Pressure relief plugs 150 and 152 are removed. One of the bonnet bolts 28 is threaded into the opening 196 and brought into actuating contact with the bottom surface 198 of the bearing retainer member 168. Another one of the bonnet bolts is then threaded into threaded receptacle 210 in the upper trunnion of the ball 22 in the manner shown in FIG. 2. This permits the ball member to be efficiently supported while it is carefully extracted from the valve chamber so as to prevent damage to the spherical sealing surface 114. For extraction, the ball member must be positioned with its flow passage in registry with the flow passages of the valve body and with its stem slot in the upper trunnion or journal of ball member oriented at 90° to the flow passages in the body. This position is also illustrated in FIG. 2. The bearing retainer is then forced upwardly by rotating the lower cap screw with a wrench while simultaneously applying an upwardly directed force to the cap screw inserted into the upper trunnion of the ball. Upward movement of the bearing retainer will cause the camming angle 166 on the upper face of the bearing retainer to engage with the tapered cam surfaces 162 and 164 of the seat members in the manner shown in FIG. 2. Continued upward movement of the bearing retainer will force the seat members more deeply into the seat recesses until the outside diameter of the bearing retainer becomes positioned between the end faces of the seat members in the manner shown in FIG. 3.

If any media from the line fluid has leaked into the seat recesses and solidified sufficiently to create an obstruction preventing the seat rings from being retracted, any suitable softening or dissolving agent may be injected into the passages 142 and 144 above the seat recesses so that the seat members may then be retracted to their maximum extent into the respective seat recesses. During retraction movement of the seat rings, the sharp edges 106 and 108 scrape away any deposits present on cylindrical surfaces 80 and 86. With the seat members retracted in this matter, ball member 22 is simply removed by applying an upward force on the bolt member threaded into the upper trunnion or journal of the ball member.

The bottom cap screw is then removed from its threaded opening 196 and the static electricity grounding spring 218 is also removed. Thereafter, the bearing retainer member 168 is forced downwardly into fully seated relationship within the bottom recess of the valve body, allowing the seat members to move toward one another to the extent induced by the spring sets 126 and 128. The seat members, with the wave springs and seals in assembly therewith, may then be extracted manually from the seat recesses. In the event manual extraction is difficult, a suitable pry tool such as a screwdriver or the like may be inserted into the external circumferential grooves 93 and 95 on seat ring members to thus apply a prying force to the seat members to break them loose from the seat recesses. When loosened, the seat members are simply withdrawn from the seat recesses and are moved upwardly to remove them through the body opening. In the event the lower trunnion bearing is to be replaced, the bearing retainer is then removed for bearing replacement.

In view of the foregoing, it is apparent that the present invention is clearly adapted to accomplish all of the features hereinabove set forth, together with other features which will become obvious and inherent from a description of the apparatus itself. It will be understood that certain combinations and sub-combinations are of utility and may be employed without reference to other features and sub-combinations. This is contemplated by and is within the scope of the present invention.

What is claimed is:

1. A top entry ball valve, comprising:
   (a) body means defining a valve chamber and flow passage means intersecting said valve chamber, said body means forming an access passage to said valve chamber oriented substantially transverse to said flow passage means;
   (b) bonnet means being removably connected to said body means and forming a sealed closure for said access passage means;
   (c) a generally spherical valve member being rotatably supported within said valve chamber and defining a spherical sealing surface and a flow port and being rotatable substantially 90° between the open and closed positions thereof;
   (d) a pair of seat members being movably disposed in sealed relation within said body means and having sealing portions thereof in sealing engagement with said spherical surface of said valve member;
   (e) means urging said seat members into sealing engagement with said valve member; and
   (f) a bearing assembly disposed within said valve body and surrounding at least a portion of said valve member, said bearing assembly comprising seat retractor means disposed within said valve body and being controllably movable into engagement with said seat members, movement of said seat retractor means inducing retraction of said seat members away from said valve member sufficiently that said valve member is clear for insertion into and extraction from said valve chamber through said access passage.

2. A top entry ball valve as recited in claim 1 wherein:
   (a) said spherical valve member defines a face-to-face dimension along the axis of said flow port which is of less dimension than the diameter of said spherical sealing surface; and
   (b) with said spherical valve member at the open position thereof with said flow port in registry with said flow passage means, said seat members being retractable by said seat retractor means to a spaced relation exceeding said face-to-face dimension.

3. A top entry ball valve as recited in claim 2 wherein:
   said spherical valve member defines lift connector means receiving lift means for removal of said spherical valve member from said valve chamber.

4. A top entry ball valve as recited in claim 1, wherein:
   (a) said seat members define first cam surface means; and
   (b) said seat retractor means defines second cam surface means reacting with said first cam surface means upon predetermined linear movement of said seat retractor means within said valve body, causing linear retracting movement of said seat members away from said valve member.

5. A top entry ball valve as recited in claim 4, wherein:
   (a) said seat retractor means is of circular form and is linearly movable in a transverse direction relative to the direction of said flow passage means; and
   (b) said second cam surface is of frusto-conical configuration.

6. A top entry ball valve as recited in claim 5, wherein:
   said seat retractor means is adapted for interengagement with said valve body means and is operative externally of said valve body means for inducing controlled seat retracting movement of said seat retractor means.

7. A top entry ball valve as recited in claim 5, wherein:
   (a) second trunnion means extends from said spherical valve member opposite said trunnion means; and
   (b) second bearing means is provided by said bonnet means in axial registry with said bearing means and receives said second trunnion means in bearing engagement therewith; and
   (c) actuator stem means is supported in sealed rotatable assembly with said bonnet means with an internal portion thereof in driving interengagement with said second trunnion means and an external portion thereof exposed externally of said body means for controlled rotatable actuation to rotate said spherical valve member between its open and closed positions.

8. A top entry ball valve as recited in claim 7, wherein:
   said driving interengagement of said actuator stem means and said second trunnion means is defined by elongated drive slot means in said second trunnion means and elongated drive key means of said actuator stem means oriented with the longer axis thereof in transverse relation to said flow port, whereby any pressure induced downstream movement of said valve member in the closed position thereof will not induce side thrust forces to said actuator stem and axial misalignment of said actuator stem means and said second trunnion means is permitted.

9. A top entry ball valve as recited in claim 7, wherein:
   (a) said second bearing means is a sleeve bearing supported by said bonnet means; and
   (b) a through passage is formed in said bonnet means in intersecting relation with said sleeve bearing means permitting externally induced deformation of said second sleeve bearing for bearing extraction.

10. A top entry valve as recited in claim 1, wherein:
    (a) said bearing assembly defines bearing means which is provided by said seat retractor means;
    (b) trunnion means extends from said valve member and is received in bearing engagement within said bearing means; and
    (c) said seat retractor means is normally positioned clear of said seat members and is linearly movable into seat retracting engagement with said seat members.

11. A top entry ball valve as recited in claim 10, wherein:
    (a) said trunnion means defines a spring receptacle;

(b) a pin member extends from said seat retractor means into said spring receptacle; and (c) an electrical grounding spring is received about said pin member and is positioned within said spring receptacle with one end thereof in grounding contact with said spherical valve member and the opposite end thereof in grounding contact with said seat retractor means.

12. A top entry ball valve as recited in claim 1, wherein:

(a) said seat retractor means is of generally cylindrical form having tapered cam surface means directed toward said seat members, said seat retractor means forming transverse wall means;

(b) said valve body forms a retractor access opening; and (c) means extends through said extractor access opening and is controllably movable against said transverse wall means for imparting linear movement of said seat retractor means into retracting relation with said seat members.

13. A top entry ball valve as recited in claim 9, wherein:

(a) said seat retractor means is of circular form and is linearly movable in a transverse direction relative to the direction of said flow passage means; and (b) said second cam surface is of frusto-conical configuration.

14. A top entry ball valve as recited in claim 13, wherein:

said bearing means is a sleeve bearing retained by said seat retractor means receiving said trunnion means of said spherical valve member in bearing engagement therein.

15. A top entry ball valve as recited in claim 14, wherein:

said seat retractor means defines a transverse bearing access passage extending from an external wall surface of said seat retractor means and intersecting said sleeve bearing.

16. A top entry ball valve as recited in claim 9, wherein:

said seat retractor means defines pry tool receptacle means receiving a pry tool and permitting manual forcing of said seat members to desired positions within said valve body.

17. A top entry ball valve as recited in claim 1, wherein:

a static electricity grounding spring is disposed in grounding engagement with said spherical valve member and said seat retractor means.

18. A top entry ball valve as recited in claim 1, wherein:

(a) said body means defines elongate generally circular seat recess means about said flow passage means;

(b) said seat members are movably received within respective seat recess means and cooperate therewith to define annular chamber means; and (c) spring means is disposed within said annular chamber means and urge said seat members into sealing engagement with said spherical valve member.

19. A top entry ball valve as recited in claim 18, wherein:

said seat members define elongated generally cylindrical portions receiving said spring means thereabout, said elongated generally cylindrical portions terminating with increased external diameter portions defining circular shoulder means retaining said spring means in assembly with said seat members prior to insertion of said seat members into said seat recess means.

20. A top entry ball valve as recited in claim 18, including:

heat resistant seal means being disposed within said annular chamber means and interposed between said spring means and said seat members, said spring means urging said heat resistant seal means and said seat members toward said spherical valve member, upon heat induced destruction of seat sealing members said seat members establish metal-to-metal sealing with said spherical valve between said valve body and said seat members.

21. A top entry ball valve as recited in claim 18, wherein:

(a) said seat members define frusto-conical surface means; and (b) said heat resistant seal means being shaped to a form corresponding to said frusto-conical surface means and said annular chamber means.

22. A top entry ball valve as recited in claim 21, wherein:

said heat resistant seal means is of pressure energized form and is urged toward said spherical valve member by line pressure.

23. A top entry ball valve as recited in claim 18, wherein:

said seat members define pressure responsive areas of differing dimension at respective extremities thereof such that said seat members are pressure energized by a pressure developed force differential urging said seat members toward said spherical valve member.

24. A top entry ball valve as recited in claim 23, wherein:

said body means defines a block and bleed port being normally closed by a removable block and bleed plug, venting of said valve chamber by removal of said block and bleed plug permitting determination of any leakage between said generally spherical valve member and said seat members.

25. A top entry ball valve as recited in claim 18, wherein:

(a) said seat recess means is defined in part by generally cylindrical surface means; and (b) said seat means defines tapered extremities forming sharp annular scraping edges intersecting said generally cylindrical surface means and scraping accumulated material therefrom that could interfere with seat movement within said seat recess means.

26. A top entry ball valve as recited in claim 18, wherein:

at least one of said seat members is movable away from said spherical valve member by pressure within said valve chamber acting upon said seat members and developing a pressure induced force exceeding the combined force of said spring means and said force differential, thus venting excessive valve chamber pressure into said flow passage means.

27. A top entry ball valve as recited in claim 18, wherein:

(a) said body means forms pressure relief passage means intersecting said annular chamber means; and (b) plug means being received by said body means and extending into said pressure relief passage means, said plug means being removable from said pressure relief passage means and defining such volume that when removed a volumetric void exists within said pressure relief passage of sufficient dimension to receive a quantity of liquid material for softening or dissolving any fouling material within said annular chamber.

28. A top entry ball valve as recited in claim 27, wherein:

said pressure relief passage means communicate said annular chamber means and said access passage, whereby any fluid leaked past said plug means will be contained within said valve chamber and flow passage means and will not leak externally of said body means.

29. A top entry ball valve as recited in claim 27, wherein:

(a) said bonnet means defines alignment receptacle means; and (b) said plug means define bonnet alignment means being positioned within said bonnet receptacle means when said bonnet is properly positioned on said body means.

30. A top entry ball valve as recited in claim 18, wherein:

said seat members define extractor recess means adapted to receive a suitable pry tool for prying said seat members from said seat recess means for extraction of said seat members from said valve body.

31. A top entry ball valve as recited in claim 1, wherein:

said seat retractor means establishes simultaneous driving engagement with said spherical valve member and retracting engagement with said seat members, upon linear seat retracting movement of said seat retractor means said seat retractor means causes linear movement of said spherical valve member thus causing said spherical valve member to induce simultaneous camming movement of opposite portions of said seat members to thus prevent cocking of said seat members during retracting movement thereof.

32. A top entry ball valve as recited in claim 31, wherein:

(a) said spherical valve member forms a trunnion member defining an end surface;

(b) said seat retractor means defines a receptacle receiving said trunnion member and forms a wall structure, said seat retractor means further forming a circular cam surface;

(c) said seat member each defining circular cam surfaces thereon;

(d) upon linear movement of said seat retractor means said wall structure engages said end surface and imparts linear movement to said spherical valve member and said circular cam surface of said seat retractor means establishes camming engagement with said circular cam surfaces of said seat members.

33. A top entry trunnion ball valve, comprising:

(a) body means defining a valve chamber and flow passage means intersection said valve chamber, said body means forming an access passage to said valve chamber oriented substantially transverse to said flow passage means;

(b) bonnet means being removably connected to said body means and forming a sealed closure for said access passage means;

(c) a generally spherical valve member being rotatably supported within said valve chamber and defining a spherical sealing surface and a flow port and being rotatable substantially 90° between the open and closed positions thereof, said generally spherical valve member having opposed trunnion elements each defining a bearing surface;

(d) a pair of seat members being movably disposed in sealed relation within said body means and having sealing portions thereof in sealing engagement with said spherical surface of said valve member;

(e) means urging said seat members into sealing engagement with said valve member;

(f) bearing retainer means being disposed in close fitting relation within said valve body and receiving said bearing surface of one of said trunnion elements in bearing relation therein, said bearing retainer means being linearly movable within said body means, and (g) seat retractor means being defined by said bearing retainer means and being controllably movable into engagement with said seat members, selective movement of said bearing retainer means and seat retractor means within said body means inducing retraction of said seat members away from said generally spherical valve member sufficiently that said valve member is clear for insertion into and extraction from said valve chamber through said access passage.

34. A top entry trunnion ball valve as recited in claim 33, wherein:

(a) said body means defines an internally threaded seat actuator opening; and (b) externally threaded actuator moving means being received by said internally threaded seat actuator opening and establishing driving engagement with said seat retractor means, rotational movement of said actuator moving means imparting linear movement of said seat retractor means.

35. A top entry trunnion ball valve as recited in claim 34, wherein:

bolt means secures said bonnet means to said body means, one of said bolt means being receivable by said internally threaded seat actuator opening and defining said actuator moving means.

36. A top entry trunnion ball valve as recited in claim 34, including:

heat resistant seal means being disposed within said annular chamber means and interposed between said spring means and said seat members, said spring means urging said heat resistant seal means and said seat members toward said spherical valve member, upon heat induced destruction of heat sealing members said seat members establish metal-to-metal sealing with said spherical valve member and said heat resistant seal means establish sealing between said valve body and said seat members.

37. A top entry trunnion ball valve as recited in claim 34, wherein:

(a) said seat actuator opening also forms a block and bleed port; and (b) block and bleed plug means normally closing said seat actuator opening and being removable to permit seat retraction and block and bleed testing of seat sealing integrity.

* * * * *